United States Patent
Inoue et al.

(10) Patent No.: US 8,004,193 B2
(45) Date of Patent: Aug. 23, 2011

(54) GLASS COMPOSITION AND DISPLAY PANEL USING THE SAME

(75) Inventors: Osamu Inoue, Osaka (JP); Shinya Hasegawa, Osaka (JP); Yasuhiko Nakada, Osaka (JP); Tsutomu Koshizuka, Osaka (JP)

(73) Assignee: Panasonic Corporation, Osaka (JP)

( * ) Notice: Subject to any disclaimer, the term of this patent is extended or adjusted under 35 U.S.C. 154(b) by 399 days.

(21) Appl. No.: 12/094,340

(22) PCT Filed: Nov. 2, 2006

(86) PCT No.: PCT/JP2006/321971
§ 371 (c)(1),
(2), (4) Date: May 20, 2008

(87) PCT Pub. No.: WO2007/058078
PCT Pub. Date: May 24, 2007

(65) Prior Publication Data
US 2009/0160334 A1 Jun. 25, 2009

(30) Foreign Application Priority Data
Nov. 21, 2005 (JP) ................. 2005-335478

(51) Int. Cl.
*H01J 17/49* (2006.01)
*C03C 23/00* (2006.01)
(52) U.S. Cl. .......... 313/587; 313/582; 313/584; 445/24; 445/25
(58) Field of Classification Search .................. None
See application file for complete search history.

(56) References Cited

U.S. PATENT DOCUMENTS

| | | | | |
|---|---|---|---|---|
| 5,100,452 A | * | 3/1992 | Dumbaugh, Jr. | 65/23 |
| 6,215,246 B1 | * | 4/2001 | Kim et al. | 313/584 |
| 6,897,610 B1 | * | 5/2005 | Aoki et al. | 313/586 |

FOREIGN PATENT DOCUMENTS

| | | |
|---|---|---|
| GB | 443343 A | 2/1936 |
| GB | 721513 A | 1/1955 |
| JP | 5-279061 A | 10/1993 |
| JP | 9-278482 A | 10/1997 |
| JP | 2000-226232 A | 8/2000 |
| JP | 2000-313635 A | 11/2000 |
| JP | 2001-139345 A | 5/2001 |
| JP | 2002-274883 A | 9/2002 |
| JP | 2002-367510 A | 12/2002 |
| LU | 41396 A1 | 5/1962 |

OTHER PUBLICATIONS

Yamanaka et al., Japanese Patent Application publication 2001-172046, Dec. 1999_machine_translation.*

* cited by examiner

*Primary Examiner* — Anne Hines
*Assistant Examiner* — Tracie Green
(74) *Attorney, Agent, or Firm* — Hamre, Schumann, Mueller & Larson, P.C.

(57) ABSTRACT

A glass composition of the present invention is an oxide glass, in which the percentages of elements except for oxygen (O) contained therein are as follows, in terms of atom %: the amount of boron (B) exceeds 72% but does not exceed 86%, the total amount of lithium (Li), sodium (Na), and potassium (K) is 8% to 20%, the total amount of magnesium (Mg), calcium (Ca), strontium (Sr), and barium (Ba) is 1% to 8%, the amount of silicon (Si) is from 0% to less than 15%, and the amount of zinc (Zn) is from 0% to less than 2%. This glass composition further may contain molybdenum (Mo) and/or tungsten (W) in the range of more than 0% but not more than 3%.

10 Claims, 4 Drawing Sheets

GLASS COMPOSITION AND DISPLAY PANEL USING THE SAME

TECHNICAL FIELD

The present invention relates to glass compositions suitable for covering electrodes, and display panels, particularly plasma display panels, using the same.

BACKGROUND ART

In displays and integrated circuits such as plasma display panels (hereinafter abbreviated as "PDP"), field emission displays, liquid crystal displays, fluorescent displays, ceramic laminated devices, and hybrid integrated circuits, substrates are used that have electrodes and wirings formed of, for example, Ag or Cu on the surfaces thereof. Such electrodes and wirings may be covered with insulating glass materials for protection. A PDP, which is a typical display, is described below as an example.

Generally, a PDP is configured to include two opposing glass substrates that are provided with a pair of electrodes arranged regularly, with gas that mainly contains inactive gas, such as Ne or Xe, being sealed therebetween. In the PDP, voltage is applied between electrodes to allow electric discharge to be generated in minute cells located around the electrodes, so that each cell is allowed to emit light and thereby display is performed. These electrodes are covered with an insulating material called a dielectric layer for protection.

For instance, in a glass substrate to serve as the front panel of an AC type PDP, transparent electrodes are formed and electrodes of metal, such as Ag, Cu, or Al, with lower resistivity are formed further thereon. A dielectric layer is formed covering those combined electrodes, and a protective layer (MgO layer) is formed further thereon.

The dielectric layer to be formed covering the electrodes can be a thin film of, for example, $SiO_2$ formed by a method such as CVD. Usually, however, from the viewpoints of equipment and cost, glass with a low softening point is used. The dielectric layer is formed by applying a paste containing glass powder to cover electrodes by, for instance, a screen printing method or a die coating method, and then baking it.

The characteristics required of a glass composition that forms a dielectric layer include, for example:
(1) having insulation properties because it is formed on electrodes;
(2) having a thermal expansion coefficient that is not greatly different from that of the substrate material so as to prevent the glass substrate from warping and the dielectric layer from peeling off and cracking in the case of a large-area panel;
(3) being amorphous glass with a high visible light transmittance so as to use efficiently the light generated from phosphors as display light when being used for a front panel; and
(4) having a lower softening point so as to conform to the heat resistance of substrate glass.

Examples of the glass substrate to be used for a PDP include soda lime glass, which is window sheet glass that is produced by a float process and is generally readily available, and glass with a high strain point developed for PDPs. They usually have a heat resistance up to 600° C. and a thermal expansion coefficient of $75 \times 10^{-7}$ to $85 \times 10^{-7}$/° C.

Accordingly, with respect to the item (2) described above, the thermal expansion coefficient is desirably about $60 \times 10^{-7}$ to $90 \times 10^{-7}$/° C. With respect to the item (4) described above, since it is necessary to bake the glass paste at 600° C. or lower, which is the strain point of the glass substrate, the glass composition needs to have a softening point of 595° C. or lower, more desirably about 590° C. or lower so as to be softened enough even if the glass paste is baked at a temperature of 600° C. or lower.

Currently, $PbO$—$SiO_2$ glass whose main raw material is PbO is used mainly as a glass material that satisfies the requirements as described above.

However, environmental concerns in recent years require dielectric layers that are free from Pb. Furthermore, glass materials are required to have even lower permittivity in order to reduce power consumption of PDPs. For example, a $Bi_2O_3$—$B_2O_3$—$ZnO$—$SiO_2$ glass material (see, for example, JP 2001-139345 A) having a lower softening point achieved by containing zinc borate as a main component thereof and Bi instead of Pb has been developed as glass that is free from Pb. However, like the Pb material, the Bi material also has a problem in that its relative permittivity is as high as about 9 to 13. At present, there are demands for materials with distinctly lower permittivity than that thereof, for example, materials with a relative permittivity of 7 or lower, more desirably 6 or lower.

Therefore, materials also are proposed that have attained a relative permittivity of around 7 by using the zinc borate glass (alkali metal oxide-$B_2O_3$—$ZnO$—$SiO_2$ glass) containing alkali metal instead of Pb in order to obtain both a low permittivity and a low softening point (see, for example, JP 9 (1997)-278482 A, JP 2000-313635 A, and JP 2002-274883 A).

However, in the alkali zinc borate glass that has been studied conventionally, the lowest relative permittivity is only 6.4. Furthermore, although it is allowed to have a low softening point, suitable thermal expansion coefficient, and low permittivity at the same time, glass having a high glass transition temperature (glass transition point) in addition thereto has been difficult to obtain.

If the glass to be obtained is one for simply covering electrodes, it is enough to allow it to have a low softening point, a suitable thermal expansion coefficient, and a low permittivity. However, in the case of PDPs, after the electrodes are covered with glass, the glass layer is heated again at a temperature of nearly 500° C. in, for example, the step of annealing a MgO layer and the sealing step of joining a front panel and a rear panel to each other. Since the softening point of the glass for a dielectric layer is a little lower than 600° C., it will not necessarily be softened even if it is heated at a temperature of about 500° C. However, if this heating temperature exceeds the glass transition temperature considerably, the thermal expansion coefficient will increase rapidly. Accordingly, especially, in a large area display, a dielectric layer will separate from a substrate or will crack, which results in a decrease in insulation and reliability. According to the studies made by the inventors, in order to reheat-treat the glass at about 500° C., the glass transition temperature required of the glass is desirably at least 465° C. and more desirably at least 480° C. Similarly in, for example, displays other than PDPs and circuit boards, when electrodes and wirings are covered with a glass material and thereafter the glass material is heat-treated at a high temperature again, there was a risk of similar problems arising.

According to the studies made by the inventors, in order to allow alkali zinc borate glass to have a low permittivity, it is necessary to increase the amount of boron, but an increase in the amount of boron tends to lower the glass transition temperature. In conventional glass for covering electrodes, attention was not paid to the glass transition temperature at all.

Accordingly, a material having a high glass transition temperature as well as a low softening point, a low permittivity, and a suitable thermal expansion coefficient has not been obtained.

Furthermore, in alkali glass containing a large amount of boron, there also is a problem in that a heat treatment tends to cause components to sublimate/evaporate. This evaporation phenomenon significantly occurs mainly between the glass transition temperature and the softening temperature and thereby evaporated components may adhere to other places on the substrate to deteriorate the insulation properties or may enter the protective film (MgO layer) formed on the dielectric layer to deteriorate the properties of the protective layer.

DISCLOSURE OF INVENTION

The present invention is intended to provide a glass composition and a display panel using the same. The glass composition has a low softening point, a low permittivity, and a thermal expansion coefficient that matches well with that of a substrate to be used for a display panel. Furthermore, the glass composition has a high glass transition point and a reduced amount of components that evaporate during baking, and allows a highly reliable display panel to be produced.

The glass composition of the present invention is an oxide glass, with percentages of elements except for oxygen (O) contained therein being:

72 atom %<boron (B)≦86 atom %,
8 atom %≦R≦20 atom %,
1 atom %≦M≦8 atom %,
0 atom %≦silicon (Si)<15 atom %, and
0 atom %≦zinc (Zn)<2 atom %, where R indicates the total amount of lithium (Li), sodium (Na), and potassium (K), and M denotes the total amount of magnesium (Mg), calcium (Ca), strontium (Sr), and barium (Ba). In the glass composition of the present invention, the phrase "percentages of elements except for oxygen (O) contained therein" denotes "proportions of respective elements in the case where the sum total of the contents of elements except for oxygen (O) contained therein is considered to be 100 atom %". The same applies to the percentages (atomic percentages) of the elements described below.

The present invention can provide a glass composition that has a low softening point, a low permittivity, a thermal expansion coefficient that matches well with that of a substrate to be used for a display panel, a high glass transition point, and a reduced amount of components that evaporate during baking, and makes it possible to produce a highly reliable display panel.

Moreover, the present invention provides a display panel produced using the above-mentioned glass composition according to the present invention.

A first display panel of the present invention is a display panel in which electrodes are covered with a dielectric layer containing a glass composition, wherein the glass composition is the above-mentioned glass composition of the present invention.

A second display panel of the present invention is a display panel in which electrodes are covered with a dielectric layer containing a glass composition, wherein the dielectric layer includes a first dielectric layer that directly covers the electrodes and a second dielectric layer that is disposed on the first dielectric layer, the glass composition contained in the first dielectric layer is substantially free from alkali metal elements, and the glass composition contained in the second dielectric layer is the glass composition according to claim 1.

A third display panel of the present invention is a plasma display panel including a front panel provided with a first electrode, a rear panel that has a second electrode crossing the first electrode and that is disposed to oppose the front panel, a dielectric layer that covers at least one selected from the first electrode and the second electrode, and barrier ribs disposed between the front panel and the rear panel to form discharge spaces, wherein at least one selected from the dielectric layer and the barrier ribs contains a glass composition, and the glass composition is the above-mentioned glass composition of the present invention.

A fourth display panel of the present invention includes a first dielectric layer disposed on a substrate, an electrode disposed on the first dielectric layer, and a second dielectric layer disposed on the electrode, wherein a glass composition contained in the first dielectric layer is the above-mentioned glass composition of the present invention.

With the first to fourth display panels of the present invention, highly reliable display panels can be provided.

DESCRIPTION OF THE PREFERRED EMBODIMENTS

Figure 1:
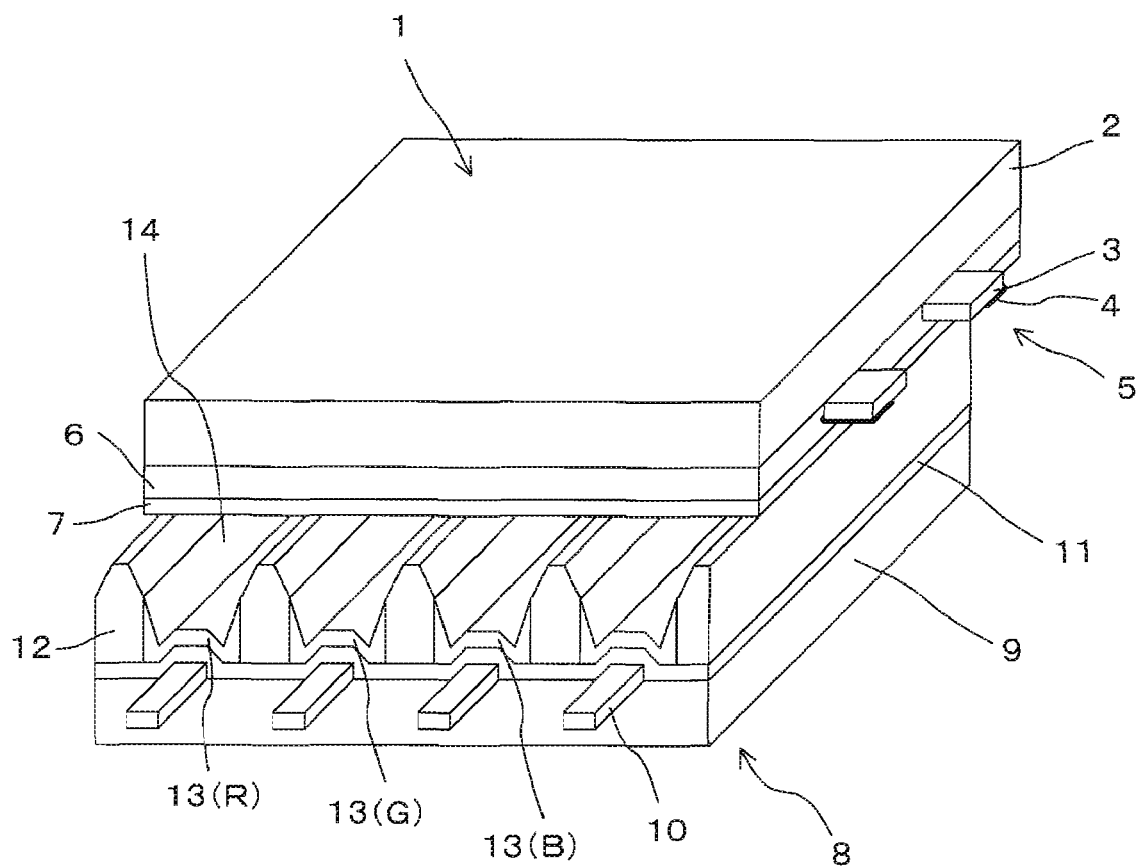
FIG. 1 is a partially cutaway perspective view showing an example of the configuration of a PDP according to the present invention.

As a result of detailed studies, the present inventors found that it was possible to obtain a glass composition having a considerably low permittivity while having a low softening point, a thermal expansion coefficient that matches well with that of a substrate, and a sufficiently high glass transition temperature, as well as a reduced amount of components that evaporate during baking, and having no disadvantages of the conventional zinc borate glass containing alkali metal, within the composition range as described above.

According to the present invention, it is possible to obtain a glass composition with a softening point of 595° C. or lower, a glass transition temperature of at least 465° C., a thermal expansion coefficient of $60 \times 10^{-7}/°$ C. to $90 \times 10^{-7}/°$ C., and a relative permittivity of 6 or lower.

Alkali-containing glass with a low permittivity, such as the glass composition of the present invention, contains alkali metal as a component thereof. Accordingly, when it is used as a dielectric material for protecting, for example, electrodes containing Ag or Cu, depending on the conditions for baking, Ag or Cu may be oxidized to be ionized, and these ions may diffuse in the glass and may be reduced again to deposit as colloidal metal, which may cause so-called yellowing where a dielectric layer and a glass substrate appear to be colored yellow. When yellowing occurs, particularly in the case of using it as a dielectric layer for the front panel of a PDP, display performance will be deteriorated. Therefore, it is preferable that the glass composition of the present invention further contain at least one selected from molybdenum (Mo) and tungsten (W) in the range of more than 0 atom % but not more than 3 atom %. This can prevent yellowing of the dielectric layer and the glass substrate that is caused by ionization of Ag or Cu contained in the electrodes.

Hereinafter, the roles of respective components and the reasons for limiting the contents thereof in the glass composition of the present invention are described.

B is a main component of the glass composition according to the present invention. With an increase in the amount of B, the permittivity decreases, the softening point is lowered, and the glass transition temperature also is lowered. In the glass composition of the present invention, the reason for limiting the content of B in the range of more than 72 atom % but not more than 86 atom % is that when the content of B is less than the range, the permittivity increases or the softening point increases, while when the content of B is more than the range, the glass transition temperature decreases excessively.

Alkali metals (Li, Na, K) are essential components of the glass composition according to the present invention. The reason for limiting the total amount thereof in the range of 8 atom % to 20 atom % is that when it is less than the range, the softening point increases excessively while when it exceeds the range, the thermal expansion coefficient increases excessively.

Alkaline-earth metals (Mg, Ca, Sr, Ba) are essential components of the glass composition according to the present invention. Since the glass composition of the present invention contains a large amount of B, the glass transition temperature tends to be lowered. However, the glass transition temperature can be increased by merely adding a small amount of at least one element selected from Mg, Ca, Sr, and Ba. Similarly, examples of the components capable of increasing the glass transition temperature include lanthanum (La). However, the addition of La has disadvantages in that the glass transition temperature increases and the softening point also increases to a similar extent. On the other hand, the addition of alkaline-earth metal can increase the glass transition temperature without increasing the softening point considerably, and the amount thereof is 1 atom % or more. Furthermore, the reason for limiting the content of alkaline-earth metals to 8 atom % or less is that an excessive amount thereof results in a high softening point and an excessively high permittivity. When the same amounts of different types of alkaline-earth metals are compared to one another, Ca has the highest effect of increasing the glass transition temperature and subsequently Sr, Ba, and Mg each provide a decreasing effect in this order. Ba has the highest permittivity, followed by Sr, Ca, and Mg in this order. Accordingly, among these, Ca is most preferable.

Si is not an essential element of the glass composition of the present invention. However, when Si is contained, the permittivity can be lowered and the chemical stability of glass can be improved. The reason for limiting the content thereof to less than 15 atom % is because the softening point increases excessively when this is exceeded.

Zn is not an essential component of the glass composition according to the present invention. Addition of Zn can increase the glass transition temperature to a certain extent but results in an increase in permittivity. Furthermore, when Zn is present together with a large amount of B contained in a composition, the amount of components that evaporate during baking tends to increase. Accordingly, the content of Zn may be 0, or it also is possible for Zn to be contained if it is a small amount. The reason for limiting the amount of Zn to less than 2 atom % is because a larger amount than that results in an excessively high permittivity or increases the amount of components that evaporate during baking. Furthermore, when the amount of Zn is 0 or is less than 2 atom %, the glass composition of the present invention can have improved sputtering resistance. Therefore, there is an advantage in that the protective layer made of MgO to be formed on the surface of the dielectric layer is not always required to be provided for the whole surface thereof in a PDP.

Mo and W are not essential components. However, addition thereof can reduce yellowing that may be caused when the glass composition is used as a material for covering electrodes containing, for example, Ag. The reason for limiting the amount thereof to 3 atom % or less is because the effect obtained by adding it is not clear when the amount thereof is excessively small, while coloring that is caused by those elements contained therein will become too strong when the amount thereof is excessively large.

The mechanism of reducing yellowing by addition of Mo and W is not necessarily clear at present. However, these metals become $MoO_4^{2-}$ and $WO_4^{2-}$ in glass and they bind to $Ag^+$ and $Cu^{2+}$ that are generated by heating to be dispersed in the glass, and stabilize these metal ions to prevent them ($Ag^+$ and $Cu^{2+}$) from being reduced to be deposited as metal colloid. In other words, conceivably, they serve as stabilizers for Ag ions and Cu ions.

The glass composition of the present invention contains the above-mentioned components and typically is composed substantially only of the above-mentioned components (in other words, substantially may not contain any components other than those described above) but may contain other components, as long as the effects of the present invention can be obtained. The sum total of the contents of the aforementioned other components is preferably 5 atom % or less, more preferably 3 atom %, and further preferably 1 atom % or less.

Specific examples of the aforementioned other components include rare earth metal elements such as yttrium (Y) and lanthanum (La) as well as vanadium (V), antimony (Sb), phosphorus (P), bismuth (Bi), titanium (Ti), cobalt (Co), and copper (Cu). The rare earth metal elements such as yttrium (Y) and lanthanum (La) increase the glass transition temperature by about 10 to 20° C., but they also increase the softening point to a similar extent. Accordingly, when both the glass transition temperature and the softening point are low in the basic composition of the glass composition according to the present invention, it is advantageous to add a rare earth metal element to increase those temperatures. Vanadium (V), antimony (Sb), phosphorus (P), and bismuth (Bi) lower the glass transition temperature by about 10 to 20° C. but also lower the softening point to a similar extent. Accordingly, when both the glass transition temperature and the softening point are high in the basic composition of the glass composition according to the present invention, it is advantageous to add the elements such as V to decrease those temperatures. Titanium (Ti), cobalt (Co), and copper (Cu) color glass blue. Accordingly, when yellowing occurs, it is advantageous to add those elements for preventing the color balance from being disrupted by the blue color, which is a complementary color. The desirable upper limit of the amount of these additives is preferably 5 atom % and more preferably 3 atom % as described above. This is because when they exceed the upper limit, the glass is colored heavily and has a high permittivity.

Besides them, for example, aluminum (Al), zirconium (Zr), manganese (Mn), niobium (Nb), tantalum (Ta), tellurium (Te), and silver (Ag) also can be added to adjust the thermal expansion coefficient, stabilize the glass, and improve the chemical durability, as long as they are used in a small amount. The sum of the contents thereof also is preferably 5 atom % or less, more preferably 3 atom %, and further preferably 1 atom % or less.

Preferably, the glass composition of the present invention is substantially free from lead (Pb). This is because addition of Pb can cause problems such as the influence on the environment, an increase in permittivity, coloring of glass, and an increase in material cost.

In this specification, the phrase "substantially free" denotes that as described above, a trace amount of component that is industrially difficult to remove and that does not affect the properties is tolerated. Specifically, it denotes that the content is 1 atom % or less, more preferably 0.1 atom % or less.

In this specification, the percentages of elements are indicated in percentages of cations alone, but oxygen is present as anions in glass since it is an oxide glass. When the above-mentioned cations are expressed in units of oxides as is common practice, they can be expressed as $B_2O_3$, $SiO_2$, ZnO, $K_2O$, $Na_2O$, $Li_2O$, MgO, CaO, SrO, BaO, $MoO_3$, and $WO_3$ (however, these expressions do not limit the valence of each cation in glass).

Generally, a glass composition is indicated by weight percentage of those oxides. Since Li, Na, and K (alkali metals) as well as Mg, Ca, Sr, and Ba (alkaline-earth metals) each contribute to properties of glass in a similar manner, they often are treated as at least one of alkali metals or at least one of alkaline-earth metals. However, for example, Li and K as well as Mg and Ba have a large difference in atomic weight from each other, respectively. Therefore when the composition ratio is expressed by weight percentage with those elements present, similar effects are obtained from a lower weight in the case of Li or Mg and a higher weight in the case of K or Ba, which results in a very wide range of composition ratio. The reason for expressing the percentage of each element by atom % in the present invention is to avoid such a disadvantage.

The range of a composition including a plurality of components, which is expressed by atom % cannot be indicated in terms of a composition range expressed by weight %. For convenience, however, the case where examples of the ranges of the compositions contained in the glass composition of the present invention are approximated to be expressed by wt. % of oxides thereof is described below.

When examples of the ranges of the compositions contained in the glass composition of the present invention are approximated to be expressed by wt. %, $B_2O_3$ is 52 wt. % to 93 wt. %, $SiO_2$ is 0 wt. % to less than 26 wt. %, ZnO is 0 wt. % to less than 5 wt. %, the total amount of $K_2O$, $Na_2O$, and $Li_2O$ is 3 wt. % to 25 wt. %, and the total amount of MgO, CaO, SrO, and BaO is 1 wt. % to 30 wt. %.

Since the glass composition of the present invention contains alkali metal as a component thereof, the use thereof as a dielectric material for protecting Ag or Cu can cause yellowing depending on the conditions for baking. As described above, this yellowing can be reduced by addition of Mo or W to a certain degree, but it may not be prevented entirely, depending on the conditions for baking. In the case of using it as a dielectric layer for the front panel of a PDP, display performance will be deteriorated when yellowing occurs. In this case, when the glass composition that has a relatively high relative permittivity but is substantially free from alkali metal is used for the first dielectric layer that is brought into direct contact with electrodes (that directly covers electrodes) and the glass composition of the present invention that has a relatively low relative permittivity is used for the second dielectric layer, yellowing can be prevented while the permittivity as a whole is maintained low.

Figure 2:
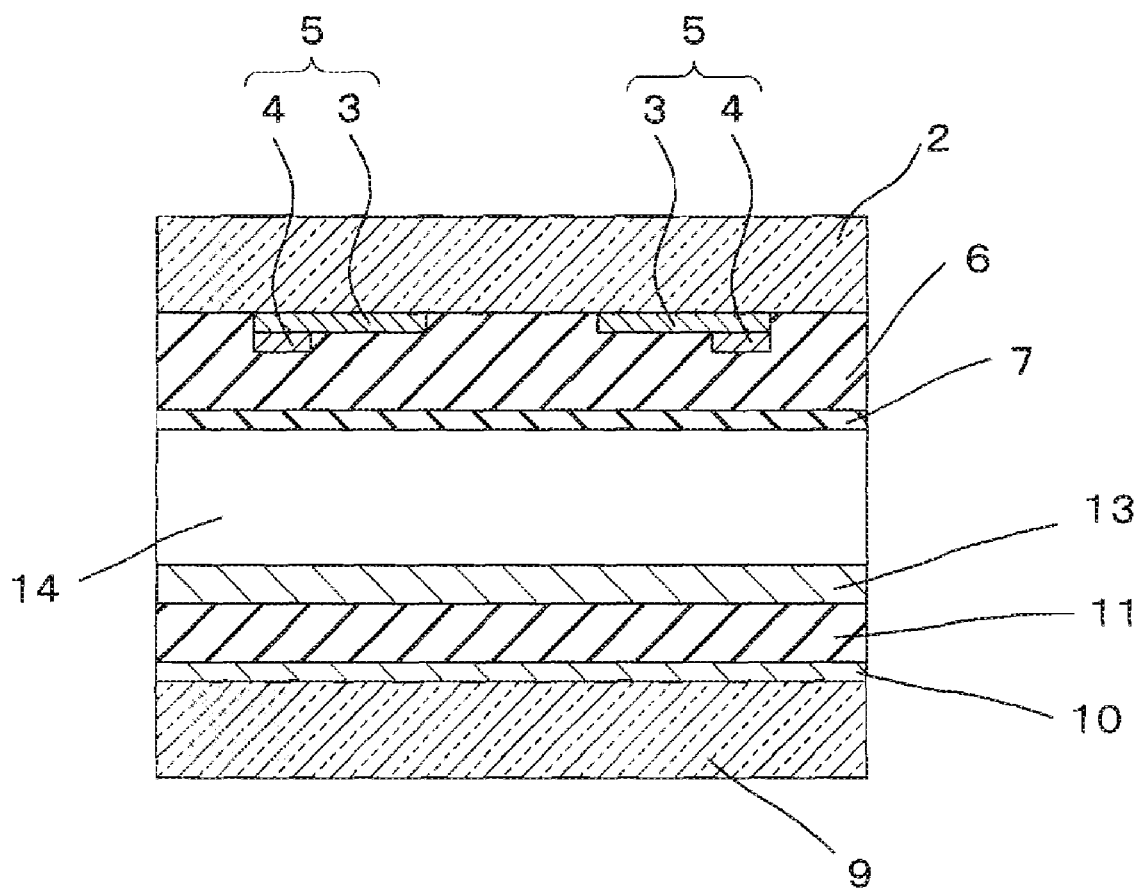
FIG. 2 is a cross-sectional view of the PDP shown in FIG. 1.

Next, a PDP is described as a specific example of the display panel according to the present invention. FIG. 1 is a partially cutaway perspective view showing the main configuration of the PDP according to this embodiment. FIG. 2 is a cross-sectional view of the PDP. This PDP is of an AC plane discharge type and has the similar configuration to those of PDPs according to conventional examples except that the dielectric layer is formed of the glass composition described above.

This PDP is formed with a front panel 1 and a rear panel 8 that are joined to each other. The front panel 1 includes a front glass substrate 2, display electrodes (first electrodes) 5, each of which is composed of a transparent conductive film 3 formed on the inner surface (the surface facing discharge spaces 14) of the front glass substrate 2 and a bus electrode 4, a dielectric layer 6 formed to cover the display electrodes 5, and a dielectric protective layer 7 made of magnesium oxide formed on the dielectric layer 6. The display electrodes 5 each are formed with the bus electrode 4 made of, for example, Ag being stacked on the transparent conductive film 3 made of ITO or tin oxide in order to ensure good conductivity.

The rear panel 8 includes a rear glass substrate 9, address electrodes (second electrodes) 10 formed on one surface thereof, a dielectric layer 11 formed to cover the address electrodes 10, barrier ribs 12 that are provided on the upper surface of the dielectric layer 11, and phosphor layers formed between the barrier ribs 12. The phosphor layers are formed so that a red phosphor layer 13(R), a green phosphor layer 13(G), and a blue phosphor layer 13(B) are arranged in this order.

Figure 4:
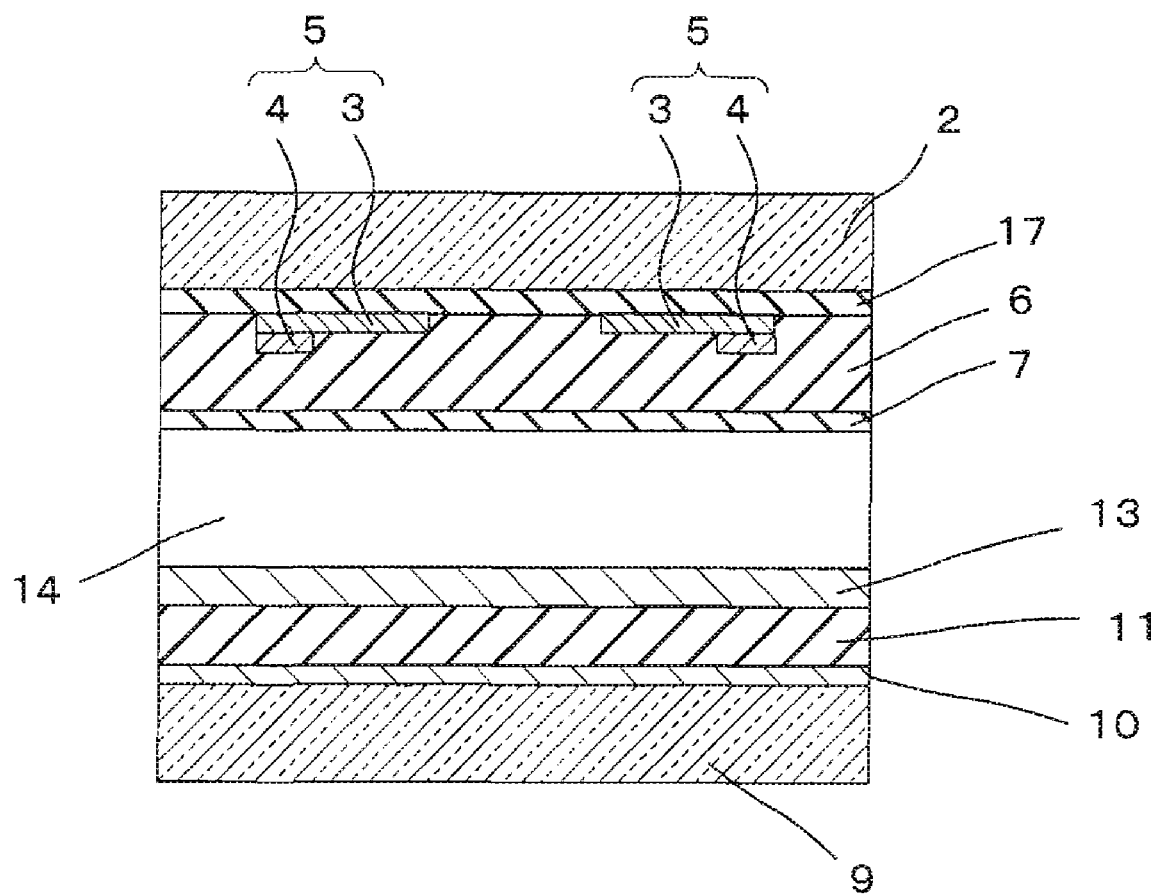
FIG. 4 is a cross-sectional view showing still another example of the configuration of a PDP according to the present invention.

The glass composition of the present invention described above is used for the dielectric layer 6 and/or the dielectric layer 11, preferably for the dielectric layer 6. Furthermore, the glass composition of the present invention can be used for the barrier ribs 12. The dielectric layer 6 needs to be transparent, but the dielectric layer 11 and the barrier ribs 12 do not need to be transparent. Therefore, when using the glass composition of the present invention for the dielectric layer 11 or the barrier ribs 12, a glass composition obtained by allowing the glass composition of the present invention to contain, for example, $SiO_2$ with a lower permittivity as filler that is dispersed therein can be used. Moreover, as shown in FIG. 4, when a dielectric layer 17 containing the glass composition of the present invention is formed between the glass substrate 2 and the display electrodes 5 or between the glass substrate 9 and the address electrodes 10, the influence of the permittivity of the substrate glass can be reduced. FIG. 4 shows an example provided with the dielectric layer 17 between the glass substrate 2 and the display electrodes 5, and the identical members (films) as those of the PDP shown in FIG. 1 are indicated with the identical numerals. In the case of the configuration (the configuration where the dielectric layer is disposed between the substrate and electrodes) shown in FIG. 4, the dielectric layer 17 corresponds to the first dielectric layer, and the dielectric layer 6 corresponds to the second dielectric layer.

The case where the glass composition of the present invention was used for the dielectric layer 6 is explained below as an example. However, since the glass composition of the present invention can achieve a low permittivity, a low softening point, a high glass transition temperature, and a suitable thermal expansion coefficient, it also can be used suitably for the dielectric layer 11, the barrier ribs 12, or the dielectric layer 17 disposed between the substrate and the electrodes.

For the phosphors of the aforementioned phosphor layers, $BaMgAl_{10}O_{17}$:Eu can be used as a blue phosphor, $Zn_2SiO_4$:Mn as a green phosphor, and $Y_2O_3$:Eu as a red phosphor, for example.

The front panel 1 and the rear panel 8 are disposed so that the display electrodes 5 and the address electrodes 10 are orthogonal to each other in their longitudinal directions and so as to oppose each other, and are joined to each other with a sealing member (not shown).

A discharge gas (filler gas) composed of a rare gas component, such as He, Xe, or Ne, is sealed in the discharge spaces 14 at a pressure of about 66.5 to 79.8 kPa (500 to 600 Torr).

The display electrodes 5 and the address electrodes 10 each are connected to an external drive circuit (not shown), voltage applied from the drive circuit allows discharges to occur in the discharge spaces 14, and the phosphor layers 13 are excited by ultraviolet rays with a short wavelength (a wavelength of 147 nm) generated according to the discharges to emit visible light.

The dielectric layer 6 is formed usually by adding, for example, a binder and a solvent for providing printing properties to glass powder to obtain a glass paste, applying the glass paste onto electrodes formed on the glass substrate, and then baking it.

The glass paste contains the glass powder, the solvent, and the resin (binder). However, it also can contain components other than these, for example, additives according to various purposes, such as a surfactant, a development accelerator, an adhesive auxiliary, an antihalation agent, a preservation stabilizer, an antifoaming agent, an antioxidant, an ultraviolet absorber, a pigment, and a dye.

Since the resin (binder) contained in the glass paste can be any one as long as it has low reactivity to glass powder having a low melting point, the type thereof is not particularly limited. From the viewpoints of, for example, chemical stability, cost, and safety, for example, cellulose derivatives such as nitrocellulose, methylcellulose, ethylcellulose, and carboxymethyl cellulose, polyvinyl alcohol, polyvinyl butyral, polyethylene glycol, carbonate resin, urethane resin, acrylic resin, and melamine resin can be used.

Since the solvent contained in the glass paste can be any one as long as it has low reactivity to glass powder, the type thereof is not particularly limited. From the viewpoints of, for example, chemical stability, cost, and safety as well as the viewpoint of compatibility with the binder resin, suitable organic solvents may be selected. Such solvents may be used independently or two or more of them may be used in combination. Specific examples of the organic solvents that can be used include: ethylene glycol monoalkyl ethers; ethylene glycol monoalkyl ether acetates; diethylene glycol dialkyl ethers; propylene glycol monoalkyl ethers; propylene glycol dialkyl ethers; propylene glycol alkyl ether acetates; esters of aliphatic carboxylic acid; and alcohols such as terpineol and benzyl alcohol.

A typical method of forming the dielectric layer 6 using the glass composition of the present invention is a method of applying the above-mentioned glass paste, for example, by a screen method or with a bar coater, a roll coater, a die coater, or a doctor blade, and then baking it. However, the method is not limited thereto. The dielectric layer 6 also can be formed by, for example, the method of attaching a sheet containing the above-mentioned glass composition and then baking it.

Preferably, the dielectric layer 6 has a thickness of approximately 10 μm to 50 μm in order to obtain both insulation properties and optical transparency.

Figure 3:
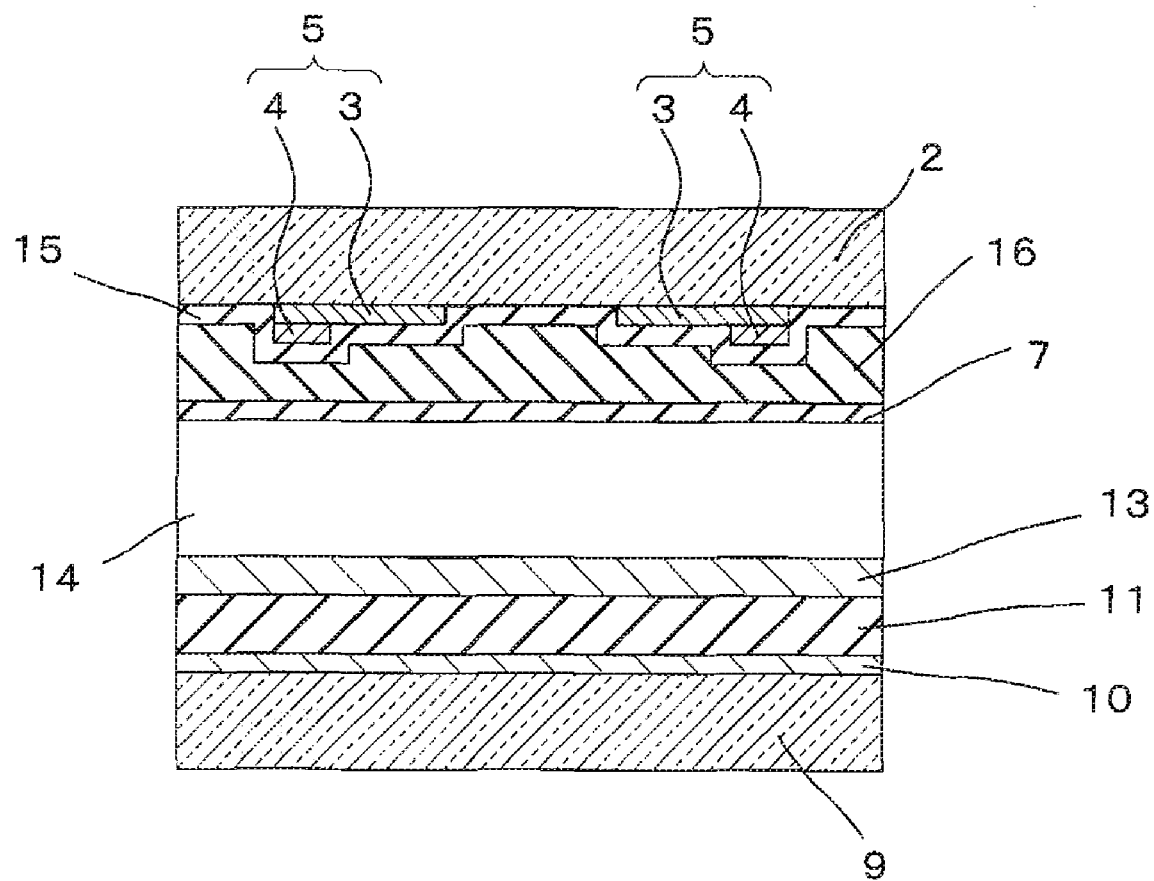
FIG. 3 is a cross-sectional view showing another example of the configuration of a PDP according to the present invention.

Next, a PDP with a dielectric layer having a two-layer structure as shown in FIG. 3 is described. The PDP shown in FIG. 3 is identical to the PDP shown in FIG. 2 except that the dielectric layer having a two-layer structure including a first dielectric layer 15 and a second dielectric layer 16 is used instead of the dielectric layer 6 (identical members (films) to those shown in FIG. 2 are indicated with the same numerals and descriptions thereof are not repeated).

As shown in FIG. 3, the first dielectric layer 15 and the second dielectric layer 16 are disposed to cover the display electrodes 5 and the first dielectric layer 15, respectively.

When the dielectric layer has a two-layer structure as described above, it is preferable that the glass composition of the present invention be used for the glass composition to be contained in the second dielectric layer 16 and a glass composition that is substantially free from alkali metal be used for the glass composition to be contained in the first dielectric layer 15. Since the first dielectric layer 15 that is in direct contact with the electrodes is substantially free from alkali metal, at least the first dielectric layer 15 can be prevented from yellowing due to the deposition of Ag or Cu colloid and having a reduced withstand voltage. Furthermore, since Ag or Cu ions are prevented from diffusing through the first dielectric layer 15, the second dielectric layer 16 also can be prevented from discoloring or having a reduced withstand voltage.

The present invention can provide a glass composition with a relative permittivity of 6 or lower. When this glass composition is used for the second dielectric layer 16, even if a material with a somewhat high permittivity is used for the first dielectric layer 15, a dielectric layer having a low permittivity as a whole can be formed. Taking into consideration that the relative permittivity of conventional Pb glass or Bi glass is 9 to 13, power consumption can be reduced even if a two-layer structure as described above is employed.

Such a dielectric layer having a two-layer structure can be formed by forming the first dielectric layer 15, applying the glass composition for the second dielectric layer, and then baking it. In this case, it is preferable that the glass composition to be used for the first dielectric layer 15 have a higher softening point than that of the glass composition contained in the second dielectric layer 16.

In order to ensure the insulation between the display electrodes 5 and the second dielectric layer 16 and the prevention of the interface reaction, it is preferable that the first dielectric layer 15 have a thickness of at least 1 μm.

In order to obtain both the insulation properties and transmittance, it is preferable that the total thickness of the first dielectric layer 15 and the second dielectric layer 16 be about 10 μm to 50 μm.

Next, a method of producing the above-mentioned PDP is described using an example. First, a front panel is produced. A plurality of linear transparent electrodes (transparent conductive films) are formed on one principal surface of a flat front glass substrate. Subsequently, a silver paste is applied onto the transparent electrodes and then is baked by heating the whole front glass substrate, and thereby bus electrodes are formed. Thus, the display electrodes, each of which is composed of a transparent conductive film and a bus electrode, are formed.

A glass paste (a glass paste containing the glass composition of the present invention in the case of this embodiment) for the dielectric layer of the PDP according to the present invention is applied to the above-mentioned principal surface of the front glass substrate by the blade coater method so as to cover the display electrodes. Thereafter, the whole front glass substrate is maintained at 90° C. for 30 minutes and thereby the glass paste is dried. Subsequently, it is baked at a temperature of around 580° C. for 10 minutes. Thus the dielectric layer is produced.

A film of magnesium oxide (MgO) is formed on the dielectric layer by an electron beam vapor deposition method and then is baked at a temperature of around 500° C. Thus the protective layer is formed.

With respect to the method of producing a PDP with a dielectric layer having a two-layer structure as shown in FIG. 3, as described above, after a glass paste for the first dielectric layer is applied to cover the display electrodes, dried, and then baked, a glass paste (a glass paste containing the glass composition of the present invention in the case of this embodiment) for the second dielectric layer is applied to cover the first dielectric layer thus formed, dried, and then baked, and thereby the second dielectric layer is formed.

Next, the rear panel is produced. After a silver paste is applied to one principal surface of a flat rear glass substrate in the form of a plurality of lines, the whole rear glass substrate is heated and thereby the silver paste is baked. Thus the address electrodes are formed.

A glass paste is applied between adjacent address electrodes, the whole rear glass substrate is heated, and thereby the glass paste is baked. Thus barrier ribs are formed.

Phosphor inks with respective R, G, and B colors are applied between adjacent barrier ribs, the rear glass substrate is heated to about 500° C., and thereby the above-mentioned phosphor inks are baked, so that, for example, resin components (binders) in the phosphor inks are removed. Thus phosphor layers are formed.

The front panel and the rear panel thus obtained are joined to each other using sealing glass at a temperature of around 500° C. Then, the sealed inner portion is subjected to high vacuum exhaust, and then rare gas is sealed therein. Thus the PDP is obtained.

The above-mentioned PDP and the method of producing it are examples and the present invention is not limited thereto. As described above, however, the dielectric layer is subjected to heat treatments at about 500° C. in baking the MgO layer and sealing the front panel and the rear panel in addition to the baking of the dielectric layer itself although each heat treatment is carried out for a short time. In this case, when the dielectric layer has an excessively low glass transition temperature, the thermal expansion coefficient increases in the temperature range beyond the glass transition temperature, and therefore the dielectric layer may be cracked or separated and thus cannot be used. According to the studies made by the inventors, the glass composition contained in the dielectric layer has desirably a glass transition temperature of at least 465° C., further desirably at least 480° C.

The PDP to which the present invention is applied is typically a plane discharge type as described above but the present invention is not limited thereto. The present invention also is applicable to an opposed discharge type. Moreover, the PDP is not limited to the AC type. The present invention also is applicable to a PDP with a dielectric layer even when the PDP is of a DC type.

The glass composition of the present invention can be used effectively not only for PDPs but also for display panels that need to be heat-treated at a high temperature of about 500° C. again after the heat treatment for forming a glass layer.

The glass composition of the present invention is suitable for display panels in which electrodes covered with a dielectric layer contain at least one selected from Ag and Cu. The electrodes may contain Ag as a main component thereof.

EXAMPLES

Hereinafter, the present invention is described in further detail using examples.

Example 1

Oxides or carbonates of various metals of at least special grade reagents were used as starting materials. These materials were weighed so that the elements except for oxygen (O) and carbon (C) have the percentages (atomic percentages) as indicated in Table 1. They were mixed well and then were placed in a platinum crucible to be melted in an electric furnace with a temperature of 900 to 1100° C. for two hours. The melt thus obtained was pressed with brass plates to be cooled rapidly and a glass cullet was produced. This glass cullet was pulverized to have an average particle size of about 2 to 3 μm. Then, the tentative glass transition temperature Tg* and softening point Ts thereof were measured using a macro differential thermal analyzer (manufactured by Rigaku Corporation, TG8110). At the same time, the weight decrease ΔW caused by evaporation of the glass components was measured between 300° C. to 600° C. by thermogravimetric analysis.

Next, the glass cullet was re-melted, poured into a mold, and annealed at a temperature +40° C. higher than the tentative glass transition temperature Tg* for 30 minutes. Thereafter, it was cooled gradually and thus a glass block was produced. From this glass block, a 4 mm×4 mm×20 mm rod was produced by a cutting process. Thereafter, the glass transition temperature Tg and the thermal expansion coefficient α between 30° C. and 300° C. were measured using a thermomechanical analyzer (manufactured by Rigaku Corporation, TMA8310). Furthermore, a plate with a size of 20 mm×20 mm×about 1 mm thickness was produced from the glass block by a cutting process. Both surfaces thereof were subjected to mirror polishing and then gold electrodes were vapor-deposited on the surfaces. Thereafter capacitance was measured at a frequency of 1 kHz using an impedance analyzer 4294A manufactured by Agilent Technologies, Inc., and the relative permittivity ∈ was calculated from the area and thickness of the sample.

The measurement results are shown in Table 1. In each table shown below, the glass transition temperature Tg and softening point Ts are indicated in units of ° C., the thermal expansion coefficient α in units of ×10$^{-7}$/° C., and the weight decrease ΔW in units of wt. %.

TABLE 1

| Sample | Composition ratio (atom %) | | | | | | | Various properties | | | | | Ex./ |
| --- | --- | --- | --- | --- | --- | --- | --- | --- | --- | --- | --- | --- | --- |
| No. | B | Si | Zn | Ca | Li | Na | K | Tg | Ts | α | ∈ | ΔW | Comp. Ex. |
| 1 | 70 | 10 | 8 | 1 | 4 | | 7 | 484 | 592 | 71 | 6.3 | 0.36 | Comp. Ex. |
| 2 | 72 | 10 | 6 | 1 | 4 | | 7 | 481 | 591 | 72 | 6.1 | 0.44 | Comp. Ex. |
| 3 | 73 | 10 | 5 | 1 | 4 | | 7 | 480 | 591 | 72 | 5.9 | 0.48 | Comp. Ex. |
| 4 | 76 | 10 | 2 | 1 | 4 | | 7 | 478 | 589 | 73 | 5.6 | 0.23 | Comp. Ex. |
| 5 | 76.1 | 10 | 1.9 | 1 | 4 | | 7 | 478 | 587 | 73 | 5.6 | 0.13 | Ex. |
| 6 | 70 | 17 | 1 | 1 | 4 | | 7 | 495 | 605 | 72 | 5.5 | 0.01 | Comp. Ex. |
| 7 | 72 | 15 | 1 | 1 | 4 | | 7 | 489 | 600 | 72 | 5.5 | 0.02 | Comp. Ex. |
| 8 | 72.5 | 14.5 | 1 | 1 | 4 | | 7 | 486 | 594 | 72 | 5.5 | 0.02 | Ex. |
| 9 | 73 | 14 | 1 | 1 | 4 | | 7 | 485 | 593 | 72 | 5.5 | 0.03 | Ex. |

TABLE 1-continued

| Sample No. | Composition ratio (atom %) | | | | | | | Various properties | | | | | Ex./ Comp. Ex. |
|---|---|---|---|---|---|---|---|---|---|---|---|---|---|
| | B | Si | Zn | Ca | Li | Na | K | Tg | Ts | α | ε | ΔW | |
| 10 | 82 | 5 | 1 | 1 | 4 | | 7 | 473 | 582 | 74 | 5.6 | 0.06 | Ex. |
| 11 | 86 | 0 | 1 | 1 | 4 | | 7 | 470 | 579 | 76 | 5.7 | 0.12 | Ex. |
| 12 | 87 | 0 | 1 | 1 | 4 | | 7 | 464 | 578 | 75 | 5.7 | 0.22 | Comp. Ex. |
| 13 | 88 | 0 | 0 | 1 | 4 | | 7 | 459 | 576 | 76 | 5.6 | 0.29 | Comp. Ex. |
| 14 | 76 | 10 | 0 | 3 | | | 11 | 495 | 594 | 81 | 5.6 | 0.02 | Ex. |
| 15 | 76 | 9 | 1 | 3 | | | 11 | 495 | 593 | 80 | 5.7 | 0.04 | Ex. |
| 16 | 76 | 8.9 | 1.9 | 3 | | | 11 | 494 | 592 | 80 | 5.8 | 0.08 | Ex. |
| 17 | 76 | 8 | 2 | 3 | | | 11 | 494 | 592 | 80 | 5.8 | 0.21 | Comp. Ex. |
| 18 | 76 | 7 | 3 | 3 | | | 11 | 493 | 591 | 80 | 5.9 | 0.26 | Comp. Ex. |
| 19 | 76 | 5 | 5 | 3 | | | 11 | 490 | 589 | 80 | 6.1 | 0.49 | Comp. Ex. |
| 20 | 80 | 6 | 0 | 3 | | 5 | 6 | 486 | 585 | 77 | 5.7 | 0.04 | Ex. |
| 21 | 79 | 6 | 1 | 3 | | 5 | 6 | 487 | 586 | 76 | 5.8 | 0.06 | Ex. |
| 22 | 78.9 | 6 | 1.9 | 3 | | 5 | 6 | 488 | 586 | 76 | 5.9 | 0.10 | Ex. |
| 23 | 78 | 6 | 2 | 3 | | 5 | 6 | 488 | 586 | 76 | 5.9 | 0.22 | Comp. Ex. |
| 24 | 77 | 6 | 3 | 3 | | 5 | 6 | 489 | 587 | 76 | 6.0 | 0.32 | Comp. Ex. |
| 25 | 75 | 6 | 5 | 3 | | 5 | 6 | 489 | 588 | 75 | 6.2 | 0.55 | Comp. Ex. |
| 26 | 75 | 14 | 1 | 4 | | | 6 | 506 | 604 | 74 | 5.7 | 0.03 | Comp. Ex. |
| 27 | 75 | 12 | 1 | 4 | | | 8 | 498 | 595 | 77 | 5.7 | 0.03 | Ex. |
| 28 | 75 | 5 | 1 | 4 | | | 15 | 486 | 582 | 87 | 5.8 | 0.05 | Ex. |
| 29 | 75 | 0 | 1 | 4 | | | 20 | 480 | 575 | 90 | 5.9 | 0.08 | Ex. |
| 30 | 75 | 0 | 0 | 4 | | | 22 | 463 | 561 | 94 | 5.9 | 0.04 | Comp. Ex. |
| 31 | 75 | 12 | 1 | 4 | | 8 | | 497 | 594 | 69 | 5.7 | 0.04 | Ex. |
| 32 | 75 | 0 | 1 | 4 | | 20 | | 477 | 573 | 76 | 6.0 | 0.06 | Ex. |
| 33 | 75 | 12 | 1 | 4 | 8 | | | 494 | 590 | 67 | 5.7 | 0.05 | Ex. |
| 34 | 75 | 0 | 1 | 4 | 20 | | | 475 | 570 | 69 | 6.0 | 0.08 | Ex. |
| 35 | 75 | 5 | 1 | 4 | 5 | 5 | 5 | 481 | 578 | 76 | 5.9 | 0.07 | Ex. |

As is apparent from Table 1, in Sample Nos. 1 to 5 in which the amounts of Si, Ca, Li, and K were fixed, the amount of B was increased, and the amount of Zn was reduced, the relative permittivity decreased with an increase in the amount of B and a decrease in the amount of Zn. Furthermore, only in sample No. 5 containing a small amount of Zn, specifically, less than 2 atom %, the weight decrease did not exceed 0.2 wt %.

In Sample Nos. 6 to 13 in which the amounts of Ca, Li, and K were fixed, the amount of Zn was 1 atom % or less, the amount of B was increased, and the amount of Si was reduced, the softening point as well as the glass transition temperature decreased with an increase in the amount of B. The relative permittivity was 6 or lower. In Sample Nos. 6 to 11 in which the amount of B was 86 atom % or less, the weight decrease was small, specifically, 0.2 wt % or less. On the other hand, in Sample Nos. 12 and 13 in which the amount of B was 87 atom % or more, the weight decrease was large, specifically, more than 0.2 wt %.

From Sample Nos. 1 to 13, in order to obtain a relative permittivity of 6.0 or lower, a softening point of 595° C. or lower, a glass transition point of at least 465° C., and a weight decrease of 0.2 wt % or less, it was necessary that the amount of B was in the range of more than 72 atom % but not more than 86 atom %, and the amount of Zn was less than 2 atom %.

In Sample Nos. 14 to 19 in which the amount of B was 76 atom %, the amounts of Ca and K were fixed, the amount of Zn was increased, and the amount of Si was decreased, the relative permittivity as well as the weight decrease increased with an increase in the amount of Zn. Furthermore, similarly in Sample Nos. 20 to 25 in which the amounts of Si, Ca, Na, and K were fixed, the amount of Zn was increased, and the amount of B was decreased, the relative permittivity as well as the weight decrease increased with an increase in the amount of Zn. Particularly, the weight decrease depends on the amount of Zn considerably. In order to obtain a weight decrease of 0.2 wt. % or less, the amount of Zn needed to be less than 2 atom %.

In Sample Nos. 26 to 30 in which the amount of B was 75 atom %, the amount of K was increased, and the amount of Si was decreased, the softening point exceeded 595° C. when the amount of K was less than 8 atom %, while the thermal expansion coefficient exceeded $90 \times 10^{-7}$ and glass transition point was 465° C. or lower when the amount of K exceeded 20 atom %. In Sample Nos. 31 to 34 in which K was substituted with Na or Li whose amount was 8 atom % or 20 atom %, the softening point and the glass transition temperature decreased in order of K, Na, and Li but no large difference was observed. The thermal expansion coefficient decreased in order of K, Na, and Li. In the case of using Na or Li, the thermal expansion coefficient did not exceed $90 \times 10^{-7}$ even when the amount of Na or Li exceeded 20 atom %. However, the relative permittivity was higher in the case of using Na and Li as compared to the case of using K, and it was clear that the relative permittivity exceeded 6 when the amount of Na or Li exceeded 20 atom %. Furthermore, it also was clear that an amount of Na or Li exceeding 20 atom % resulted in a glass transition temperature of lower than 465° C. When Li, Na, and K were used in combination, average properties were obtained as indicated in Sample No. 35. Accordingly, it was proved that in order to obtain a relative permittivity of 6 or lower, a thermal expansion coefficient of $90 \times 10^{-7}$ or lower, and a glass transition temperature of at least 465° C. at the same time, the total amount of Li, Na, and K (Li+Na+K) satisfied the range of 8 atom % to 20 atom %.

With respect to the amount of Si, it was proved that the satisfactory properties were obtained when it was in the range of 0 atom % or more but less than 15 atom % as long as the contents of the other elements were in the ranges of the present invention.

The inventors examined various combinations of compositions other than those described above. However, in all cases, when the compositions were adjusted in the ranges of 72 atom %<B≦86 atom %, 8 atom %≦Li+Na+K≦20 atom %, 0 atom %≦Si<15 atom %, and 0 atom %≦Zn<2 atom %, it was possible to obtain glass with good properties that had a relative permittivity of 6.0 or lower, a glass transition temperature of at least 465° C., a softening point of 595° C. or lower, and a thermal expansion coefficient of $60 \times 10^{-7}$ to $90 \times 10^{-7}/°$ C. at the same time as well as a weight decrease during baking of 0.2 wt. % or less.

Example 2

Glass cullets and glass rods each were produced in such a manner as to have the atomic percentages of the respective metal elements as indicated in Table 2 by the same methods as in Example 1. Thus Samples Nos. 41 to 65 were obtained. The glass transition temperature Tg, the softening point Ts, the thermal expansion coefficient α, the relative permittivity E, and the weight decrease ΔW were determined by the same methods as in Example 1. Since the weight decrease ΔW was 0.2 wt % or less in all the samples, the measurement results other than this are indicated in Table 2.

TABLE 2

| Sample No. | Composition ratio (atom %) | | | | | | | | Various properties | | | | Ex./ Comp. Ex. |
|---|---|---|---|---|---|---|---|---|---|---|---|---|---|
| | B | Si | K | Li | Mg | Ca | Sr | Ba | Tg | Ts | α | ε | |
| 41 | 82.0 | 5.0 | 10.0 | 3.0 | | | | | 452 | 577 | 78 | 5.6 | Comp. Ex. |
| 42 | 81.5 | 5.0 | 10.0 | 3.0 | 0.5 | | | | 457 | 578 | 78 | 5.6 | Comp. Ex. |
| 43 | 81.1 | 5.0 | 9.9 | 3.0 | 1.0 | | | | 467 | 580 | 78 | 5.6 | Ex. |
| 44 | 80.4 | 4.9 | 9.8 | 2.9 | 2.0 | | | | 472 | 584 | 79 | 5.6 | Ex. |
| 45 | 77.8 | 4.8 | 9.5 | 2.9 | 5.0 | | | | 478 | 588 | 81 | 5.7 | Ex. |
| 46 | 75.4 | 4.6 | 9.2 | 2.8 | 8.0 | | | | 481 | 591 | 82 | 5.8 | Ex. |
| 47 | 73.8 | 4.5 | 9.0 | 2.7 | 10.0 | | | | 490 | 601 | 84 | 6.1 | Comp. Ex. |
| 48 | 81.5 | 5.0 | 10.0 | 3.0 | | 0.5 | | | 461 | 578 | 78 | 5.6 | Comp. Ex. |
| 49 | 81.1 | 5.0 | 9.9 | 3.0 | | 1.0 | | | 474 | 582 | 78 | 5.6 | Ex. |
| 50 | 80.4 | 4.9 | 9.8 | 2.9 | | 2.0 | | | 488 | 586 | 79 | 5.7 | Ex. |
| 51 | 77.8 | 4.8 | 9.5 | 2.9 | | 5.0 | | | 495 | 591 | 81 | 5.8 | Ex. |
| 52 | 75.4 | 4.6 | 9.2 | 2.8 | | 8.0 | | | 502 | 595 | 84 | 5.8 | Ex. |
| 53 | 73.8 | 4.5 | 9.0 | 2.7 | | 10.0 | | | 520 | 610 | 85 | 6.2 | Comp. Ex. |
| 54 | 81.5 | 5.0 | 10.0 | 3.0 | | | 0.5 | | 459 | 578 | 78 | 5.6 | Comp. Ex. |
| 55 | 81.1 | 5.0 | 9.9 | 3.0 | | | 1.0 | | 471 | 581 | 78 | 5.6 | Ex. |
| 56 | 80.4 | 4.9 | 9.8 | 2.9 | | | 2.0 | | 480 | 582 | 79 | 5.7 | Ex. |
| 57 | 77.8 | 4.8 | 9.5 | 2.9 | | | 5.0 | | 490 | 589 | 82 | 5.8 | Ex. |
| 58 | 75.4 | 4.6 | 9.2 | 2.8 | | | 8.0 | | 496 | 593 | 85 | 6.0 | Ex. |
| 59 | 73.8 | 4.5 | 9.0 | 2.7 | | | 10.0 | | 511 | 606 | 87 | 6.4 | Comp. Ex. |
| 60 | 81.5 | 5.0 | 10.0 | 3.0 | | | | 0.5 | 458 | 578 | 79 | 5.6 | Comp. Ex. |
| 61 | 81.1 | 5.0 | 9.9 | 3.0 | | | | 1.0 | 467 | 579 | 80 | 5.6 | Ex. |
| 62 | 80.4 | 4.9 | 9.8 | 2.9 | | | | 2.0 | 475 | 581 | 81 | 5.7 | Ex. |
| 63 | 77.8 | 4.8 | 9.5 | 2.9 | | | | 5.0 | 484 | 585 | 84 | 5.9 | Ex. |
| 64 | 75.4 | 4.6 | 9.2 | 2.8 | | | | 8.0 | 491 | 590 | 88 | 6.0 | Ex. |
| 65 | 73.8 | 4.5 | 9.0 | 2.7 | | | | 10.0 | 504 | 601 | 91 | 6.6 | Comp. Ex. |

As is apparent from Table 2, addition of alkaline-earth metal (Mg, Ca, Sr, or Ba) in an amount of at least 1 atom % made it possible to increase the glass transition temperature Tg without greatly increasing the softening point Ts and to obtain a glass transition temperature Tg of at least 465° C. and further at least 480° C. depending on the amount thereof added. However, the addition of these elements is accompanied by increases in relative permittivity ∈ and softening point Ts. Accordingly, the amount of the aforementioned alkaline-earth metal (Mg, Ca, Sr, or Ba) to be added is desirably 8 atom % or less. When the aforementioned elements are compared to each other, the amount of Ca that is required to be added to obtain a glass transition temperature Tg of at least 480° C. is the least, and addition of Ca causes less increase in relative permittivity ∈. Although it is not indicated in this example, the inventors also examined the same effects obtained through the addition of alkaline-earth metal at ratios of B:Si:Zn: alkali metal other than those employed in this example. As a result, the same effects were obtained in all cases. Furthermore, simultaneous addition of a plurality of alkaline-earth metal elements was examined. As a result, an average effect was exhibited. Accordingly, it was also possible to add a plurality of alkaline-earth metal elements and to set the total amount thereof at 8 atom % or less.

Example 3

Glass cullets and glass rods in which, with respect to the atomic ratios of the respective metal elements, K:Ca=14:4 and further B, Si, Mo, and W were as indicated in Table 3 were produced by the same methods as in Example 1. Thus Samples Nos. 71 to 88 were obtained. The glass transition temperature Tg, the softening point Ts, the thermal expansion coefficient α, and the relative permittivity ∈ were determined by the same methods as in Example 1. In Table 3, the total amount of the components (B+Si+Mo+W) is not 100%. This is because the remainder is composed of K and Ca that were added at the aforementioned atomic ratio.

Next, ethyl cellulose, which is resin, and alpha-terpineol to serve as a solvent were added to each glass powder. They were mixed together and dispersed with a three roll mill, and thereby a glass paste was prepared.

Next, a substrate with an electrode pattern formed thereon (a substrate with electrodes) was prepared. A material of ITO (transparent electrode) was applied in a predetermined pattern on the surface of flat soda lime glass with a thickness of about 2.8 mm, and was then dried. Subsequently, a silver paste, which was a mixture of silver powder and an organic vehicle, was applied in the form of a plurality of lines. Thereafter the whole substrate was heated and thereby the silver paste was baked. Thus a substrate with electrodes was obtained.

The pastes containing the various glass compositions produced above each were applied to the substrate with electrodes, using the blade coater method. Thereafter, each of them was maintained at 90° C. for 30 minutes and thereby the glass paste was dried. It then was baked at a temperature 10° C. higher than the softening point for 10 minutes. Thus, a dielectric layer was formed.

On the rear side (i.e. the side where no electrodes were present) of the substrate thus produced, the reflected colors were measured using a color difference meter. Natural light was used for the measurement, and correction was made with a white plate that served as a reference.

The measurement results are indicated in Table 3. "a*" and "b*" are based on the L*a*b* color system. The value of "a*" that increases in the plus direction denotes stronger red, while the value of "a*" that increases in the minus direction denotes stronger green. On the other hand, the value of b* that increases in the plus direction denotes stronger yellow, while the value of "b*" that increases in the minus direction denotes stronger blue. Generally, when the value of a* is in the range of −5 to +5 and the value of b* also is in the range of −5 to +5, no coloring of the panels is observed. Therefore, it is desirable that they be in this range. Even when the value of b* exceeds +5, it is possible to correct the color into a normal color by adding an element capable of canceling the color or using a color filter. Accordingly, there is no problem as long as the value of b* is in a range that allows the color to be corrected using a certain means (however, desirably a lower value), and it is desirably +5 or lower.

TABLE 3

| Sample No. | Composition ratio (atom %) | | | | Various properties | | | | | |
|---|---|---|---|---|---|---|---|---|---|---|
| | B | Si | Mo | W | Tg | Ts | α | ε | a* | b* |
| 71 | 74.0 | 8 | 0 | 0 | 490 | 588 | 86 | 5.7 | −2.1 | 22.3 |
| 72 | 73.95 | 8 | 0.05 | 0 | 482 | 588 | 86 | 5.7 | −2.1 | 10.2 |
| 73 | 73.9 | 8 | 0.1 | 0 | 482 | 588 | 86 | 5.7 | −2.1 | 4.9 |
| 74 | 73.5 | 8 | 0.5 | 0 | 481 | 587 | 86 | 5.7 | −2.1 | 4.2 |
| 75 | 73 | 8 | 1 | 0 | 480 | 585 | 86 | 5.8 | −2.1 | 3.4 |
| 76 | 73 | 7 | 2 | 0 | 480 | 582 | 86 | 5.8 | −2.2 | 4.0 |
| 77 | 73 | 6 | 3 | 0 | 479 | 580 | 87 | 5.9 | −2.2 | 4.9 |
| 78 | 73 | 4 | 5 | 0 | 477 | 579 | 88 | 6.2 | −2.2 | 7.5 |
| 79 | 73.95 | 8 | 0 | 0.05 | 482 | 588 | 86 | 5.7 | −2.1 | 11.9 |
| 80 | 73.9 | 8 | 0 | 0.1 | 482 | 588 | 86 | 5.7 | −2.1 | 5.0 |
| 81 | 73.5 | 8 | 0 | 0.5 | 482 | 587 | 86 | 5.7 | −2.1 | 4.4 |
| 82 | 73 | 8 | 0 | 1 | 482 | 584 | 86 | 5.8 | −2.2 | 3.6 |
| 83 | 73 | 7 | 0 | 2 | 481 | 582 | 87 | 5.9 | −2.2 | 4.2 |
| 84 | 73 | 6 | 0 | 3 | 480 | 570 | 87 | 6.0 | −2.2 | 5.0 |
| 85 | 73 | 4 | 0 | 5 | 478 | 577 | 88 | 6.3 | −2.2 | 8.8 |
| 86 | 73.9 | 8 | 0.05 | 0.05 | 482 | 587 | 86 | 5.7 | −2.1 | 4.9 |
| 87 | 73 | 7 | 1 | 1 | 480 | 582 | 86 | 5.8 | −2.1 | 3.7 |
| 88 | 73 | 4 | 3 | 2 | 475 | 578 | 87 | 6.0 | −2.2 | 8.9 |

As is apparent from Table 3, the value of b* decreased with an increase in the amount of $MoO_3$ or $WO_3$ added (atomic percentage of Mo or W) and was 5 or lower when the amount of $MoO_3$ or $WO_3$ added was at least 0.1 atom %, and thereby yellowing was prevented more effectively. However, the value of b* started increasing again with a further increase in the amount of $MoO_3$ or $WO_3$ added and exceeded 5 when the amount was 5 atom %. Conceivably, this is because the yellowing phenomenon itself that is caused due to deposition of Ag colloid tends not to occur but $MoO_3$ or $WO_3$ itself colors glass. Therefore the amount of $MoO_3$ or $WO_3$ to be added is desirably 0.1 atom % to 3 atom %.

The inventors also examined the effect of adding $MoO_3$ or $WO_3$ with respect to those with base glass having different main composition ratios. It was confirmed that in the respective compositions in the composition ranges of the present invention, addition of $MoO_3$ or $WO_3$ prevented yellowing.

Example 4

In Example 4, a PDP having the same configuration as that of the PDP shown in FIG. 1 was produced.

By the same method as in Example 1, powder of various raw materials were mixed so as to have an atomic ratio of B:Si:K:Li:Ca=75:8:10:4:3. This mixture then was placed in a platinum crucible. This was melted in an electric furnace at 1150° C. for two hours. Thereafter, glass cullet was produced by the twin roller method. This glass cullet was pulverized by a dry type ball mill to produce glass powder. The glass powder thus obtained had an average particle size of about 5 μm. The glass obtained in this example had a relative permittivity of 5.7, a glass transition temperature of 485° C., a softening point of 582° C., and a thermal expansion coefficient of $79 \times 10^{-7}$/° C.

Ethyl cellulose and alpha-terpineol were added to the powder as a binder and a solvent, respectively. They were mixed together with a three roll mill, and thereby a glass paste was obtained.

Next, a material of ITO (transparent electrode) was applied in a predetermined pattern onto the surface of a front glass substrate made of flat soda lime glass with a thickness of about 2.8 mm, and was then dried. Subsequently, a silver paste, which was a mixture of silver powder and an organic vehicle, was applied in the form of a plurality of lines. Thereafter, the aforementioned front glass substrate was heated and thereby the silver paste was baked to form display electrodes.

The glass paste described above was applied to the front glass substrate on which the display electrodes had been produced, using the blade coater method. Thereafter, the aforementioned front glass substrate was maintained at 90° C. for 30 minutes and thereby the glass paste was dried. It then was baked at a temperature of 585° C. for 10 minutes. Thus, a dielectric layer with a thickness of about 30 μm was formed.

Magnesium oxide (MgO) was vapor-deposited on the above-described dielectric layer by the electron beam vapor deposition method. Thereafter, it was baked at 500° C. and thereby a protective layer was formed.

The front panel was produced by the method as described above.

On the other hand, the rear panel was produced by the following method.

First, address electrodes composed mainly of silver were formed in the form of stripes on a rear glass substrate made of soda lime glass, by the screen printing. Subsequently, a dielectric layer with a thickness of about 8 μm was formed by the same method as that used for forming the front panel.

Next, a glass paste was used to form barrier ribs between adjacent address electrodes on the dielectric layer. The barrier ribs were formed by repeating the screen printing and baking.

Subsequently, phosphor pastes of red (R), green (G), and blue (B) were applied to the wall surfaces of the barrier ribs and the surface of the dielectric layer exposed between the barrier ribs, and then were dried and baked to produce phosphor layers. The materials mentioned above were used for the phosphors.

The front panel and rear panel produced above were joined to each other at 500° C. using a Bi—Zn—B—Si—O sealing glass. After the insides of the discharge spaces were evacuated to a high vacuum (about $1 \times 10^{-4}$ Pa), Ne—Xe discharge gas was sealed at a predetermined pressure. Thus, a PDP was produced.

It was confirmed that the panel thus produced did not particularly cause any defects in the dielectric layer but operated without any problems.

Example 5

In Example 5, a PDP with a dielectric layer having a two-layer structure as shown in FIG. 3 was produced.

A B—Si—K—Ca—O glass paste was prepared for the second dielectric layer by the same method as in Example 4. Separately, a Bi—Zn—B—Ca—Si—O glass paste that contained Bi, was substantially free from alkali metal, and had a relative permittivity of 11 and a softening point of 587° C. also was prepared for the first dielectric layer.

Using these pastes, a PDP panel was produced by the same method as in Example 3, in which the dielectric layer of the front panel had a two-layer structure including a first dielectric layer that directly covered electrodes and a second dielectric layer formed on the first dielectric layer. The first dielectric layer was baked at 590° C. to have a thickness of about 10 µm, and the second dielectric layer was baked at 580° C. to have a thickness of about 20 µm.

It was confirmed that the panel thus produced did not particularly cause any defects in the dielectric layers but operated without any problems.

INDUSTRIAL APPLICABILITY

The glass composition of the present invention is suitably applicable to form insulating coating glass for electrodes, particularly dielectric layers for covering display electrodes and address electrodes of plasma display panels.

The invention claimed is:

1. A glass composition, being an oxide glass, with percentages of elements except for oxygen (O) comprised therein being:
   72 atom %<boron (B)≦86 atom %,
   8 atom %≦R≦20 atom %,
   1 atom %≦Ca≦8 atom %,
   0 atom %≦silicon (Si)<15 atom %, and
   0 atom %≦zinc (Zn)<2 atom %,
where R indicates the total amount of lithium (Li), sodium (Na), and potassium (K).

2. A glass composition, being an oxide glass, with percentages of elements except for oxygen (O) comprised therein being:
   72 atom %<boron (B)≦86 atom %,
   8 atom %≦R≦20 atom %,
   1 atom %≦M≦8 atom %,
   0 atom %≦silicon (Si)<15 atom %, and
   0 atom %≦zinc (Zn)<2 atom %,
where R indicates the total amount of lithium (Li), sodium (Na), and potassium (K), and M denotes the total amount of magnesium (Mg), calcium (Ca), strontium (Sr), and barium (Ba), and
   further comprising at least one selected from molybdenum (Mo) and tungsten (W), wherein in the percentages of elements except for oxygen (O), the total amount of molybdenum (Mo) and tungsten (W) exceeds 0 atom % but does not exceed 3 atom %.

3. The glass composition according to claim 1, wherein the glass composition has a softening point of 595° C. or lower, a glass transition temperature of at least 465° C., a thermal expansion coefficient of 60×10⁻⁷ to 90×10⁻⁷/° C., and a relative permittivity of 6 or lower.

4. A display panel comprising a dielectric layer that contains a glass composition and covers an electrode, the glass composition being an oxide glass, with percentages of elements except for oxygen (O) comprised therein being:
   72 atom %<boron (B)≦86 atom %,
   8 atom %≦R≦20 atom %,
   1 atom %≦M≦8 atom %,
   0 atom %≦silicon (Si)<15 atom %, and
   0 atom %≦zinc (Zn)<2 atom %,
where R indicates the total amount of lithium (Li), sodium (Na), and potassium (K), and M denotes the total amount of magnesium (Mg), calcium (Ca), strontium (Sr), and barium (Ba).

5. A display panel comprising a dielectric layer that contains a glass composition and covers an electrode,
   wherein the dielectric layer includes a first dielectric layer that directly covers the electrode and a second dielectric layer that is disposed on the first dielectric layer, and
   a glass composition contained in the first dielectric layer is substantially free from an alkali metal element, and the second dielectric layer contains a glass composition that is an oxide glass, with percentages of elements except for oxygen (O) comprised therein being:
   72 atom %<boron (B)≦86 atom %,
   8 atom %≦R≦20 atom %,
   1 atom %≦M≦8 atom %,
   0 atom %≦silicon (Si)<15 atom %, and
   0 atom %≦zinc (Zn)<2 atom %,
where R indicates the total amount of lithium (Li), sodium (Na), and potassium (K), and M denotes the total amount of magnesium (Mg), calcium (Ca), strontium (Sr), and barium (Ba).

6. The display panel according to claim 4, wherein the electrode contains at least one selected from silver (Ag) and copper (Cu).

7. A plasma display panel comprising:
   a front panel provided with a first electrode,
   a rear panel that has a second electrode crossing the first electrode and that is disposed to oppose the front panel,
   a dielectric layer that covers at least one selected from the first electrode and the second electrode, and
   barrier ribs disposed between the front panel and the rear panel to form discharge spaces,
   wherein at least one selected from the dielectric layer and the barrier ribs contains a glass composition, the glass composition being an oxide glass, with percentages of elements except for oxygen (O) comprised therein being:
   72 atom %<boron (B)≦86 atom %,
   8 atom %≦R≦20 atom %,
   1 atom %≦M≦8 atom %,
   0 atom %≦silicon (Si)<15 atom %, and
   0 atom %≦zinc (Zn)<2 atom %,
where R indicates the total amount of lithium (Li), sodium (Na), and potassium (K), and M denotes the total amount of magnesium (Mg), calcium (Ca), strontium (Sr), and barium (Ba).

8. The display panel according to claim 7, wherein the electrode that is covered with the dielectric layer contains at least one selected from silver (Ag) and copper (Cu).

9. A display panel comprising:
   a first dielectric layer disposed on a substrate,
   an electrode disposed on the first dielectric layer, and
   a second dielectric layer disposed on the electrode, wherein the first dielectric layer contains a glass composition, the glass composition being an oxide glass, with percentages of elements except for oxygen (O) comprised therein being:
72 atom %<boron (B)≦86 atom %,
8 atom %≦R≦20 atom %,
1 atom %≦M≦8 atom %,
0 atom %≦silicon (Si)<15 atom %, and
0 atom %≦zinc (Zn)<2 atom %, where R indicates the total amount of lithium (Li), sodium (Na), and potassium (K), and M denotes the total amount of magnesium (Mg), calcium (Ca), strontium (Sr), and barium (Ba).

10. The display panel according to claim 9, wherein the electrode contains at least one selected from silver (Ag) and copper (Cu).

* * * * *